(12) United States Patent
Watzenberger et al.

(10) Patent No.: US 6,328,941 B1
(45) Date of Patent: Dec. 11, 2001

(54) THERMAL DECOMPOSITION OF $N_2O$

(75) Inventors: Otto Watzenberger, Mannheim; David Agar, Dortmund, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/480,690

(22) Filed: Jan. 11, 2000

(30) Foreign Application Priority Data

Jan. 20, 1999 (DE) ............................................. 199 02 109

(51) Int. Cl.$^7$ ............................ B01D 53/54; B01D 53/60
(52) U.S. Cl. ...................... 423/235; 423/239.1; 423/351; 423/579
(58) Field of Search ................................ 423/235, 239.1, 423/351, 579

(56) References Cited

U.S. PATENT DOCUMENTS

| | | | |
|---|---|---|---|
| 4,973,457 | 11/1990 | Kongshaug et al. | 423/235 |
| 5,429,811 | 7/1995 | Alarcon et al. | 423/235 |
| 5,612,009 | 3/1997 | Fetzer et al. | 423/239.1 |
| 6,056,928 | * 5/2000 | Fetzer | 423/235 |

FOREIGN PATENT DOCUMENTS

| | | |
|---|---|---|
| 41 16 950 | 11/1992 | (DE) . |
| 359 286 | 3/1990 | (EP) . |
| 555 110 | 8/1993 | (EP) . |
| 93/04774 | 3/1993 | (WO) . |
| WO 97/10042 | * 3/1997 | (WO) . |

OTHER PUBLICATIONS

Derwent Abstract92/391 359.

* cited by examiner

*Primary Examiner*—Wayne Langel
*Assistant Examiner*—Maribel Medina
(74) *Attorney, Agent, or Firm*—Keil & Weinkauf

(57) ABSTRACT

Recuperative heat exchangers or regenerative heat exchangers are used for the thermal decomposition of $N_2O$ in $N_2O$-containing gases. The process for the thermal decomposition of $N_2O$ in $N_2O$-containing gases at from 800 to 1200° C. comprises passing the $N_2O$-containing gas through one or more recuperative heat exchangers or regenerative heat exchangers in such a way that when the gas to be reacted is passed through a charge of heat transfer material it is heated to a temperature in the range from 800 to 1200° C. and the $N_2O$ present is decomposed thermally, and cooling the reacted gas by heat exchange so as to heat the charge of heat transfer material and the gas to be reacted.

5 Claims, 3 Drawing Sheets

THERMAL DECOMPOSITION OF $N_2O$

The invention relates to a process for the thermal decomposition of $N_2O$ in $N_2O$-containing gases and reactors suitable for this purpose.

$N_2O$ is formed, for example, as a by-product in processes in which $HNO_3$ is used as oxidizing agent in the liquid phase. Particularly in the oxidation of alcohols, aldehydes and ketones, e.g. cyclohexanol and cyclohexanone to adipic acid, acetaldehyde to glyoxal or glyoxal to glyoxylic acid, considerable amounts of $N_2O$ are liberated. Even in air fractionation plants, small amounts of $N_2O$-containing gas streams are obtained. The $N_2O$-containing gases can contain comparable amounts of $NO_x$.

$N_2O$ has a certain damage potential in respect of the earth's atmosphere. In the stratosphere, it is a significant source of NO. This in turn contributes substantially to ozone depletion in the stratosphere. Moreover, $N_2O$ acts as a greenhouse gas whose global warming potential is said to be about 290 times that of $CO_2$.

The $N_0O$ content of industrial waste gases should therefore be reduced as much as possible. It is known that in the absence of a catalyst $N_2O$ begins to decompose appreciable only at above 800° C. It is also known that as the temperature increases the decomposition no longer proceeds as desired to form $N_2$ and $O_2$, but forms increasing proportions of NO above 1000° C. The exothermic decomposition of NO into $N_2$ and $O_2$ occurs at a high rate only at above 1500° C.

The catalytic decomposition of $N_2O$ has been known for a long time. WO 93/04774 describes silver-containing catalysts suitable for decomposing $N_2O$.

The catalytic processes for decomposing $N_2O$ have the disadvantage that even small amounts of chemical and mechanical (dust) impurities in the ppm range and/or heating, above about 700 to 800° C. can lead to an activity loss through to complete destruction of the catalyst. A constant, well-defined gas composition is therefore a prerequisite for catalytic processes. Furthermore, wide fluctuations in the $N_2O$ content of the gases to be purified can, owing to the strongly exothermic nature of the decomposition reaction, lead to wandering temperature fronts and thus to intense hot spot temperatures which can result in local damage to the catalyst. There is therefore great interest in methods which make purely thermal decomposition of $N_2O$ possible.

Thermal processes for purifying waste gases contaminated by organic constituents are known. Known apparatuses are classical incineration muffles in which the waste gas is burnt together with fuel/air mixtures. Such an incineration process for the incineration of $N_2O$-containing waste gases is described, for example, in DE-A-41 16 950. Owing, to the complexity of the combustion chamber and the associated high capital costs, the process is mainly suitable for small amounts of gas.

According to EP-A-0 555 110, an $N_2O$-containing, gas is, with addition of fuel, burnt at very high temperatures directly in the flame in order to achieve formation of $NO_x$. However, the reaction occurs only in low yields.

EP-A-0 359 286 describes a process for removing $N_2O$ from the product gas from ammonia incineration. Here, the product gas from ammonia incineration is not cooled immediately but only after a hold time of from 0.1 to 3 sec. As a result, a major part of the $N_2O$ is decomposed into nitrogen and oxygen. The waste gases from the incineration can also be contacted with a metal or metal oxide catalyst. The process is tailored to use for $N_2O$ removal after ammonia incineration and is only economical when the $N_2O$-containing, gas is obtained at the necessary high temperature.

All known thermal incineration or decomposition processes for decomposing $N_2O$ have the disadvantage that additional fuels have to be burnt to produce the necessary high temperatures. Furthermore, it is technically difficult to ensure that the temperature in the combustion zone can be regulated to prevent decomposition of NO also present in the reaction gas or to prevent formation of $NO_x$, from the $N_2O$.

It is an object of the present invention to provide a process for the thermal decomposition of $N_2O$ into nitrogen and oxygen without the necessity of using a catalyst, which process can be carried out inexpensively with a minimal fuel consumption. In addition, in the case of waste gases which are free of $NO_x$ but contain $N_2O$, the $N_2O$ should be decomposed while preferably minimizing the formation of $NO_x$ from the $N_2O$. If the $N_2O$-containing gas to be purified contains relatively large amounts of $NO_x$ which, after removal of $N_2O$, which is all to be available for chemical utilization, for example for conversion into nitric acid, only the $N_2O$ should be selectively decomposed while leaving the NO completely undecomposed in the purified gas.

We have found that this object is achieved by the use of recuperative heat exchangers or regenerative heat exchangers for the thermal decomposition of $N_2O$ in $N_2O$-containing gases.

In addition, the object of the invention is achieved by a process for the thermal decomposition of $N_2O$ in $N_2O$-containing gases at from 800 to 1200° C., in which the $N_2O$-containing gas is passed through one or more recuperative heat exchangers or regenerative heat exchangers in such a way that when the gas to be reacted is passed through a charge of heat transfer material it is heated to a temperature in the range from 800 to 1200° C. and the $N_2O$ present is decomposed thermally, and the reacted gas is cooled by heat exchange so as to heat the charge of heat transfer material and the gas to be reacted.

Here, the charge of heat transfer material can be, for example, a charge of inert particles in the heat exchanger.

According to the present invention, it has been found that the thermal decomposition of $N_2O$ described in EP-A-0 359 286 can be advantageously carried out in recuperative heat exchangers or regenerative heat exchangers which are filled with inert particles, with no further energy input being required after the start-up phase. It has been found that $N_2O$ can be completely decomposed thermally on inert surfaces at temperatures as low as about 800° C. and residence times of about 2 seconds. Here, $N_2O$ can be decomposed completely in the presence of $NO_x$ with no further $NO_x$ being formed.

Such gases can come from the sources described at the outset.

The decomposition is carried out at from 800 to 1200° C., preferably from 850 to 1100° C., particularly preferably from 900 to 1000° C. The residence time of the gas in the inert charge at the decomposition temperature is preferably from 0.5 to 60 s, particularly preferably from 2 to 20 s.

The residence time is matched to the respective temperature so that the desired degree of $N_2O$ decomposition is achieved and, correspondingly, $NO_x$ formation or $NO_x$ decomposition is restricted to the extent corresponding to the respective operating boundary conditions.

The decomposition pressure selected can be adapted within a wide range to the external boundary conditions (process pressure, etc.) so as to achieve the economically most advantageous solution. The process is, in principle, not restricted to a particular pressure range. On the basis of experience, the economically most advantageous working range is from 1 to 10 bar.

In a recuperative heat exchanger, heat exchange between the gases occurs via the tube walls. In the regenerative heat exchanger reactors, beds of generally inert material function as heat storages and heat exchange media. As heat storage media, it is possible to use particles of a wide variety of shapes such as randomly shaped particles or regular molded bodies. The use of honeycombs is also possible. For example, the $\gamma$-$Al_2O_3$ rings (Pural® from Condea) of the dimensions 5×5×3 mm have been found to be useful in laboratory tests. Ceramic materials such as SiC, $SiO_2$ and many more are generally useful. Metallic fittings are also conceivable. Thermal stability up to about 1200° C. and the presence of a large specific surface area are important, since the impact of the thermally excited $N_2O$ molecule on the surface evidently leads to disintegration of the former. A specific catalytic function for $N_2O$ decomposition is not necessary, but neither is it a hindrance.

Preferably, the heat exchanger or heat exchangers is/are operated regeneratively in such a way that no external energy input is necessary after the start of the reaction. Here, the temperature of the gas entering the heat exchanger or heat exchangers is preferably in the range from 10 to 300° C., particularly preferably from 15 to 50° C., in particular ambient temperature (room temperature). The process of the present invention makes it possible to feed in and purify $N_2O$-containing waste gases which are obtained at temperatures which are significantly lower than the reaction temperatures. The process can therefore be employed universally.

In the extreme case of very good heat recovery, for example when using regenerative heat exchangers, the temperature of the gas entering the regenerative heat exchanger is only a few 10 K above the temperature of the exiting gas. The liberation of small amounts of heat of reaction are therefore sufficient to ensure autothermal operation, i.e. even gases having low $N_2O$ contents can be purified by thermal decomposition of $N_2O$ in these apparatuses without external energy input.

Excess heat of reaction which is liberated in the case of very high $N_2O$ contents can, for example, be removed by means of a steam generator built into the high-temperature region of the regenerative heat exchanger to produce hot steam. Alternatively, it is possible to discharge part of the gas (10–30%) from the high-temperature zone of the regenerator.

The invention is illustrated below with the aid of the drawing in which

Figure 1:
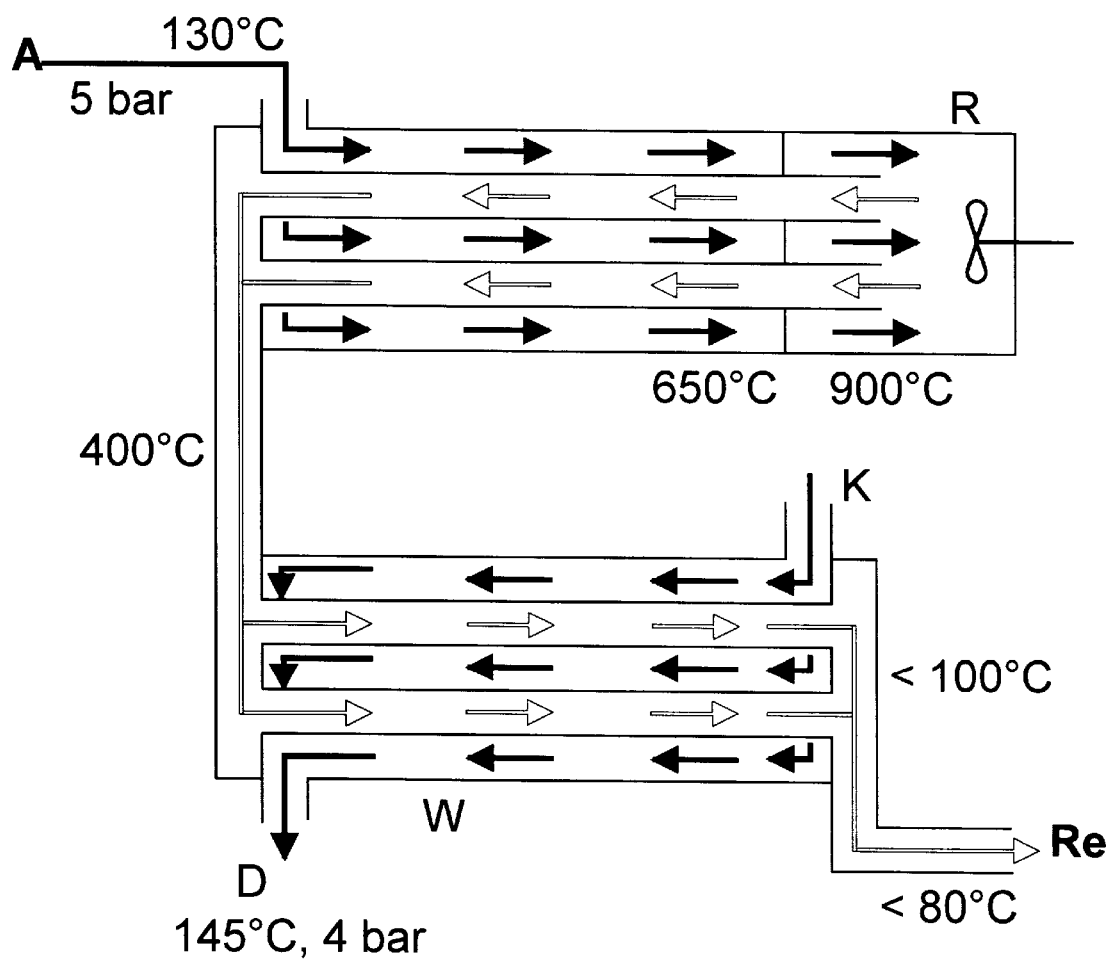
FIG. 1 shows a plant having a recuperative heat exchanger.
Figure 2:
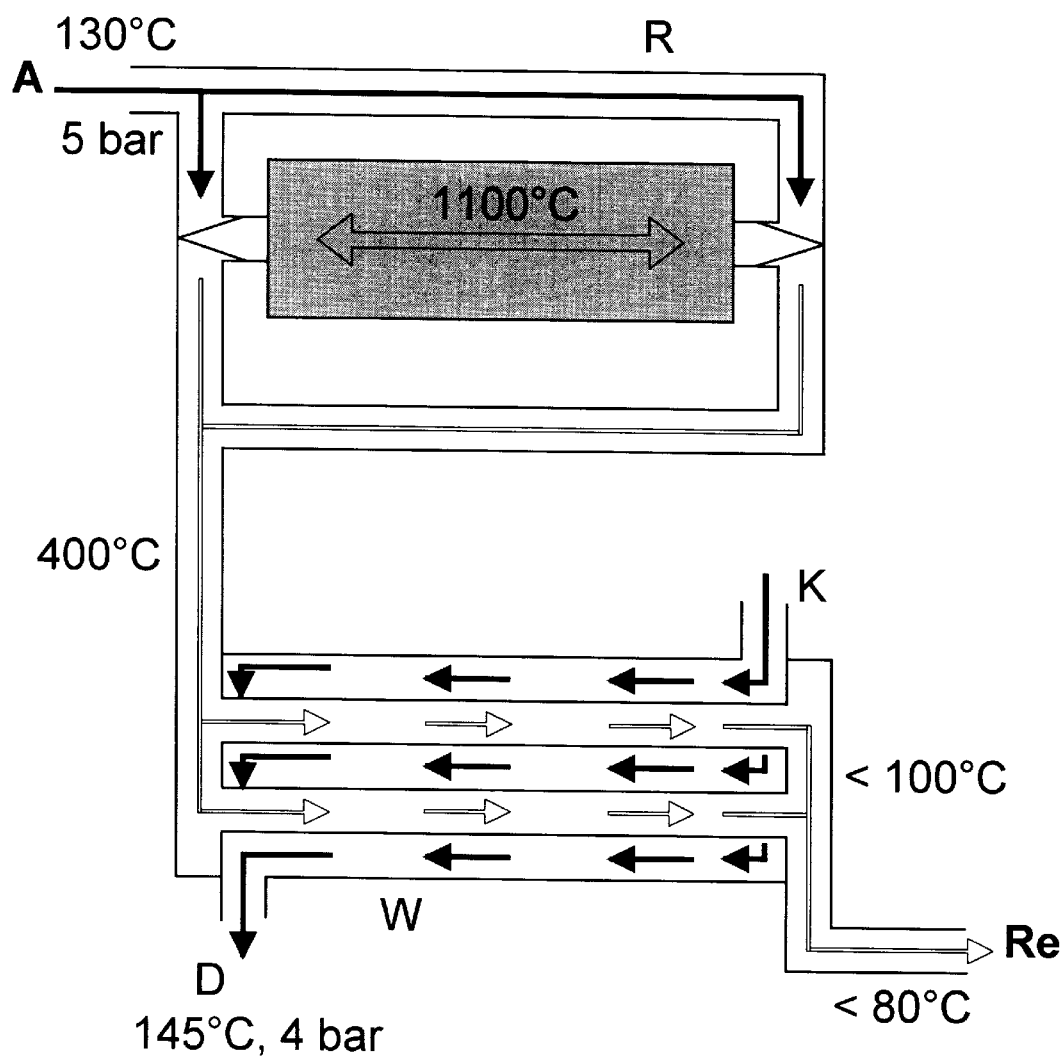
FIG. 2 shows a plant having a regenerative heat exchanger.
Figure 3:
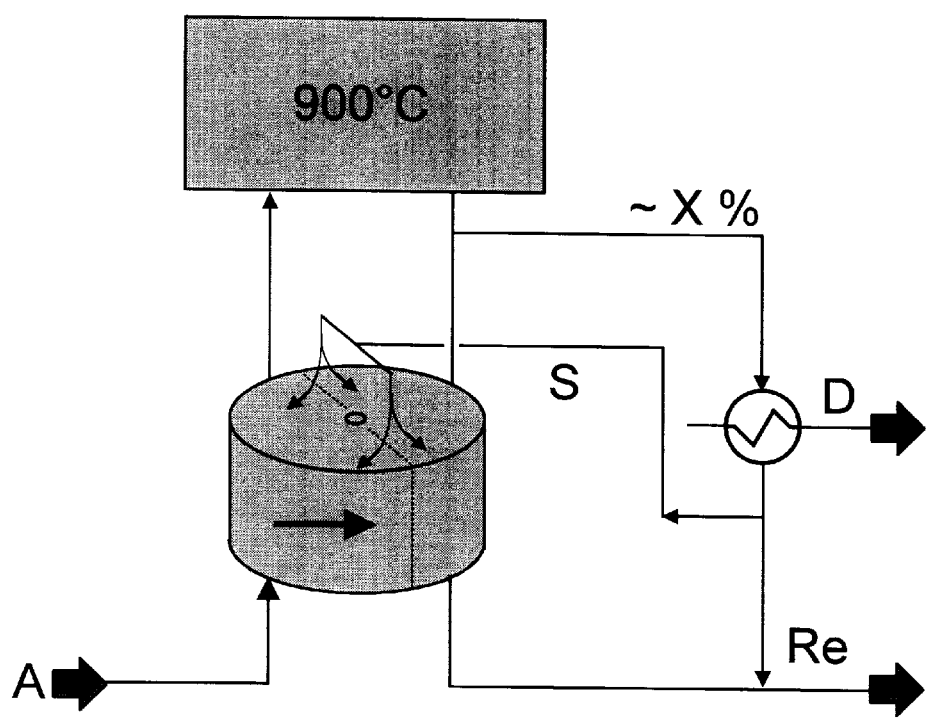
FIG. 3 shows a plant having a regenerative heat exchanger in a rotational configuration with discharge of hot gas.

In the figures, the reference numerals employed have the following meanings:

K: cooling water
W: heat exchanger
D: steam
R: reactor
A: $N_2O$-containing waste gas
S: purged gas
Re: purified gas
x%: x% discharge of hot gas The regenerative heat exchanger can be configured either as a fixed bed with periodic flow reversal (FIG. 2) or have a rotating fixed bed design (FIG. 3).

Reactors for regenerative thermal oxidation are described, for example, in VDI Bericht 1993, pages 69 to 89. Such reactors are manufactured, for example, by KEU-CITEX Energie- und Umwelttechnik, Krefeld.

Suitable ceramic materials for regenerative thermal purification of waste streams are described, for example, in Chemie-Ingenieur-Technik No. 9, 1995, pages 1192 to 1993.

The gas to be purified is heated by the exothermic reaction. The heat of the hot, purified gas is utilized to preheat fresh gas to the reaction temperature. Industrially, this preheating can be carried out, for example, recuperatively by means of gas-gas heat exchangers or regeneratively by means of paddings or beds or honeycombs of heat transfer material. Regenerative gas-gas heat exchangers operate at very high efficiency due to the large heat-exchange areas.

According to the present invention, the high thermal efficiencies of regenerative heat exchangers are combined with the thermal $N_2O$ decomposition reaction. This is achieved by using a fixed bed of inert particles, e.g. $Al_2O_3$ rings. The fixed bed is initially heated to 800 to 1 000° C. in the reaction zone (the high-temperature region). The $N_2O$-containing gas is then passed into the fixed bed. The $N_2O$-containing gas is heated to 800 to 1000° C. by heat exchange and the decomposition of the $N_2O$ commences, liberates heat and heats the inert bed and the gas. The temperature increase is dependent on various operating parameters, in particular on the $N_2O$ concentration, and can be set to any desired value by altering the operating parameters, e.g. the $N_2O$ concentration (diluent air, recirculation of purified gas).

The inflowing gas cools the inlet zone of the regenerator and the higher temperature region is shifted in the direction of the reactor outlet. The inert bed in the direction of the reactor outlet is heated by the gas which has been heated by the exothermic reaction. At the same time, the gas is cooled. The high-temperature region in the bed is thus shifted in the direction of the reactor outlet. For this reason, the flow direction has to be reversed after a certain time to stop the bed from cooling completely. Appropriate choice of the time between two flow direction changes makes it possible to stabilize a high-temperature region in the middle part of the bed. Appropriate choice of the length of the bed ensures that the outlet and inlet regions of the bed are at a very low temperature, in the extreme case only slightly above ambient temperature. However, preference is given to employing a temperature which is above the condensation temperature of the gas which may comprise water and $NO_x$ in order to avoid corrosion problems.

Due to the very effective heat transfer in the bed, the regenerative process operates at a very high thermal efficiency, i.e. no external energy input is necessary except in the start-up phase. The amount of heat liberated in the reaction should be high enough to compensate for unavoidable heat losses. In this way, even waste gases having a low $N_2O$ content can be worked up or purified in this apparatus without external energy input.

In the case of relatively high $N_2O$ concentrations in the gas to be purified, there is an opportunity to generate high-temperature steam. For this purpose, a steam generator can be installed in the high-temperature part of the bed; the steam generating capacity of this steam generator is matched to the heat of reaction in the particular case and thus to the $N_2O$ concentration. Steam generators which produce steam at a gas temperature of 800° C. are known from power station engineering. The heat exchange material can be divided into two beds and the steam generator can be switched between the two beds.

This option of steam generation makes it possible to combine the task of gas purification with the economically advantageous opportunity for producing steam. The utilization of the steam generated then depends on the local circumstances. Due to the high reaction temperature, an industrially very valuable, very high-temperature steam can be produced (up to 500° C.). However, the temperature of the steam can easily be reduced to a desired lower temperature level by spraying in condensate water.

To remove heat from the high-temperature zone or downstream of the high-temperature zone, it is also possible to take off part of the gas stream which has already been purified. The hot gas which has been discharged can be passed to an external heat exchanger for energy recovery (e.g. hot steam). In this way, accumulation in the regenerator or recuperator can be avoided.

The $N_2O$-containing gas frequently also contains large amounts of $NO_X$. This is the case particularly when the $N_2O$-containing gases are obtained as a by-product of processes in which $HNO_3$ is used as oxidizing agent in the liquid phase. In particular, the oxidation of alcohols, aldehydes and ketones, e.g. cyclohexanol and cyclohexanone to adipic acid, acetaldehyde to glyoxal or glyoxal to glyoxylic acid, liberates not only considerable amounts of $N_2O$ but also almost equimolar amounts of $NO_X$. $NO_x$ is a valuable raw material in the chemical industry. It is usually oxidized to $N_2O$ by means of air or oxygen in scrubbing columns, absorbed in water and finally converted into $HNO_3$ (nitric acid). There is therefore great commercial interest in making economic use of the $NO_x$ from the $N_2O$-containing waste gas. The absorptive separation of $NO_x$ and the production of $HNO_3$ can in principle also be carried out in a customary manner from the $N_2O$-containing gas. The $NO_X$-depleted $N_2O$-containing gas still comprises $NO_X$, $HN_3$ and water and is accordingly corrosive. It is consequently more advantageous to decompose the $N_2O$ selectively in the presence of $NO_X$. This also has the advantage that $NO_X$ which may also be formed from the decomposition of the $N_2O$ can in the end also be utilized as a raw material.

It has been found that selective decomposition of the $N_2O$ in the presence of $NO_X$ can be carried out successfully by thermal means. It is important for economics that no valuable $NO_X$ is decomposed thermally during the thermal decomposition.

Part of the $NO_2$ can be decomposed into NO and $O_2$. However, the NO is not decomposed and is therefore not lost to subsequent utilization for nitric acid production. The endothermic decomposition of $NO_2$ to NO merely has a moderating effect on the overall liberation of heat in the reaction.

The $NO_X$- and $N_2O$-containing gases obtained in the relevant chemical processes are usually highly concentrated in $NO_X$ and $N_2O$. The reaction is thus correspondingly highly exothermic. For this reason, a steam generator is preferably integrated into the fixed-bed reactor to set the maximum temperature. This makes it possible to utilize the heat of reaction for production of high-temperature (HT) steam. This HT steam can, for example, be advantageously used for driving compressors for a subsequent $NO_X$ absorption step.

As an alterative to the steam generator, heat can be removed by taking off a substream of the hot gas from the high-temperature zone. As a result, the downstream part of the bed stores only that amount of heat which is required for preheating the cold $N_2O$-containing waste gas to the decomposition temperature.

The invention is illustrated by the following examples.

EXAMPLES

Example 1

An empty metal tube made of V2A, l=6 m, d=3.17 mm, was heated to the reaction temperature of 850 to 1000° C. by external heating. $N_2O$- and NO-containing air was then passed through the tube. The residence time in the hot reactor was set to 5 and 20 seconds. Gas samples of the gas entering the reactor and of the gas leaving the reactor were taken and analyzed in the analytical laboratory: NO was determined by IR measurement and $N_2O$, $O_2$ and $N_2$ were determined by means of GC. The measurement inaccuracies are attributable to the separate analyses. The experiments and the experimental results are summarized in the following table.

| | | Reactor inlet | | | | Reactor outlet | | | | |
| --- | --- | --- | --- | --- | --- | --- | --- | --- | --- | --- |
| Sequential test No. | Standard l/h | Residence time s | Temp. ° C. | xNO % by volume | $xN_2O$ % by volume | $xN_2$ % by volume | $xO_2$ % by volume | xNO % by volume | $xNO_2$ % by volume | $xN_2O$ % by volume |
| Blank | 13 | 5 | 23 | — | 12.6 | 87.40 | 0.15 | <0.05 | 0.01 | 12.8 |
| 1 | 6.3 | 20 | 950 | 20 | 10 | 81.70 | <0.02 | 10.96 | 11.58 | 0.19 |
| 2 | 6.3 | 20 | 1000 | 20 | 10 | 79.70 | <0.02 | 0.78 | 21.03 | <0.02 |

$N_2O$ can be homogeneously decomposed to a substantial extent at only about 950 to 1000° C. and residence times of 20 s. At the same time, the experiments demonstrate that no NO decomposition takes place within measurement accuracy. At most a small degree of oxidation of NO to $NO_2$ takes place.

Example 2

The experiments below on the decomposition of $N_2O$ were carried out over a hot inert bed. A quartz reactor, V=72627.8 ml, was used for this purpose. This was heated by radiative heating to temperatures up to a maximum of 800° C. The quartz reactor was filled with $Al_2O_3$ rings (Pural® 5×5×2mm). The result is summarized in the following table.

| | | Reactor inlet | | | | Reactor outlet | | | | |
|---|---|---|---|---|---|---|---|---|---|---|
| Sequential test No. | Standard l/h | Residence time s | Temp. °C | xNO % by volume | xN$_2$O % by volume | xN$_2$ % by volume | xO$_2$ % by volume | xNO % by volume | xNO$_2$ % by volume | xN$_2$O % by volume |
| Blank | 13 | 5 | 23 | — | 12.6 | 87.40 | 0.15 | <0.05 | 0.01 | 12.8 |
|  |  |  | 23 | 20 | 10.8 | 69.4 | 0.07 | 20.25 | — | 10.5 |
| 3 | 50 | 23.7 | 847 | — | 12.45 | 93.80 | 6.42 | — | — | <0.02 |
| 4 | 100 | 11.9 | 832 | — | 12.45 | 93.70 | 5.99 | — | — | <0.02 |
| 5 | 200 | 5.9 | 827 | — | 12.45 | 93.60 | 5.95 | — | — | <0.02 |
| 6 | 25 | 47.5 | 814 | — | 12.45 | 93.50 | 5.84 | — | — | <0.02 |
| 7 | 200 | 5.9 | 795 | — | 12.45 | 94.20 | 5.93 | — | — | <0.02 |
| 8 | 400 | 3.0 | 793 | — | 12.45 | 93.60 | 6.22 | — | — | <0.02 |
| 9 | 600 | 2.0 | 792 | — | 12.45 | 87.20 | 12.4 | — | — | <0.02 |
| 10 | 200 | 5.9 | 714 | — | 12.60 | 94.10 | 6.08 | — | — | <0.02 |
| 11 | 400 | 3.0 | 785 | 10 | 11.34 | 86.70 | 6.62 | 13.25 | — | <0.02 |
| 12 | 600 | 2.0 | 781 | 10 | 11.34 | 87.10 | 6.28 | 12.85 | — | <0.02 |
| 13 | 600 | 2.0 | 795 | — | 12.60 | 92.10 | 5.79 | — | — | 0.33 |
| 14 | 600 | 2.0 | 796 | — | 12.60 | 92.00 | 5.58 | — | — | 0.5 |
| 15 | 50 | 23.8 | 773 | 20 | 10.08 | 95.30 | 2.2 | 4.42 | — | <0.02 |
| 16 | 200 | 5.9 | 773 | 20 | 10.08 | 78.20 | 6.76 | 21.41 | — | <0.02 |

These experiments confirm that N$_2$O can be completely decomposed thermally on inert surfaces at only about 800° C. and residence times of 2 s.

We claim:

1. A process for the thermal decomposition of N$_2$O in N$_2$O-containing gases at from 800 to 1200° C., which comprises passing the N$_2$O-containing gas through one or more recuperative heat exchangers or regenerative heat exchangers having a high-temperature zone and low-temperature zone in such a way that the gas to be reacted is passed through a charge of heat transfer material so as to heat it to a temperature in the range from 800 to 1200° C. and the N$_2$O present is decomposed thermally, and cooling the reacted gas by heat exchange so as to heat the heat charge of heat transfer material and the gas to be reacted, and wherein the excess heat of reaction is removed as hot steam by means of a steam generator installed in the high-temprature region of the charge of heat exchange material being at a temperature in the range from 800 to 1200° C.

2. A process as claimed in claim 1, wherein the heat exchangers are operated regeneratively in such a way that no external energy input is necessary after the start of the reaction.

3. A process as claimed in claim 1, wherein the temperature of the gas entering the heat exchanger or heat exchangers is from 10 to 300° C.

4. A process as claimed in claim 1, wherein the regenerative heat exchanger or regenerative heat exchangers is/are operated with flow reversal.

5. A process as claimed in claim 1, wherein a regenerative heat exchanger in a rotating configuration is used.

* * * * *